United States Patent [19]
Knoll

[11] Patent Number: 4,653,868
[45] Date of Patent: * Mar. 31, 1987

[54] COLLOIDAL-TYPE DISPLAY AND INDICATOR SYSTEM, AND METHOD OF ITS MANUFACTURE

[75] Inventor: Peter Knoll, Ettlingen, Fed. Rep. of Germany

[73] Assignee: Robert Bosch GmbH, Stuttgart, Fed. Rep. of Germany

[*] Notice: The portion of the term of this patent subsequent to Nov. 12, 2002 has been disclaimed.

[21] Appl. No.: 674,995

[22] Filed: Nov. 26, 1984

[30] Foreign Application Priority Data

Feb. 16, 1984 [DE] Fed. Rep. of Germany ....... 3405496

[51] Int. Cl.⁴ ............................................. G02F 1/01
[52] U.S. Cl. ................................................. 350/355
[58] Field of Search ................... 350/355, 363, 339 E, 350/357

[56] References Cited

U.S. PATENT DOCUMENTS 3,897,991 8/1975 Tsunoda et al. .................... 350/355
4,552,437 11/1985 Gantenbrink et al. .......... 350/339 F Primary Examiner—John K. Corbin
Assistant Examiner—David J. Edmondson
Attorney, Agent, or Firm—Frishauf, Holtz, Goodman & Woodward

[57] ABSTRACT

To eliminate the edge effect, a mask is applied within the cell to one of the cover plates defining the cell, preferably to the back plate electrode (3) applied at the inside of the cell to the front glass plate (2). The mask (4) can be applied by various processes, for example printing, evaporating, galvanically, photographically, or by combined vapor-depositing and etching processes. By suitable use of color, colored masking is also possible. The mask is shaped and dimensioned to sharply define the optical display in the desired pattern as determined by the shape of counter electrode (6) applied to a back support plate (7) and is so positioned with respect to that electrode that the edge effect is suppressed.

18 Claims, 1 Drawing Figure

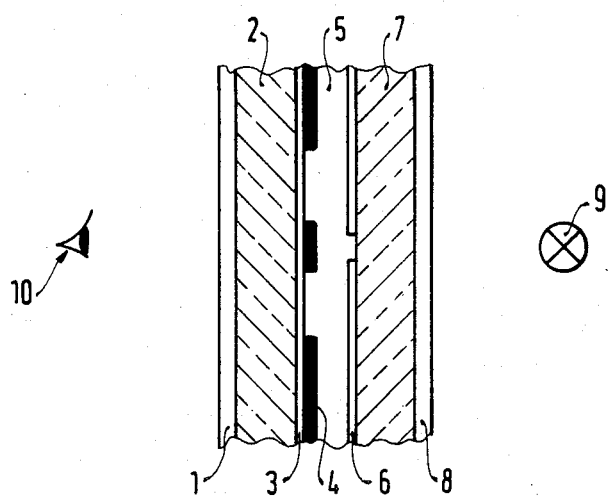

COLLOIDAL-TYPE DISPLAY AND INDICATOR SYSTEM, AND METHOD OF ITS MANUFACTURE

The present invention relates to a colloidal-type electrically controlled display and indicator system utilizing a mask, and a method of making the system.

BACKGROUND

Colloidal-type indicators and displays have been proposed, and are well known, in which electrodes are supported on electrode substrates or carriers and, when selectively energized, provide displays in the form of bars, dots or the like which, when located adjacent each other, may provide alphanumeric characters, symbols, and the like. It has also been proposed to mask display zones which are not to contain information, for example by external masks, applied to external glass surfaces of the displays. The glasses used in the colloidal indicator devices have a minimum thickness for mechanical strength and, thus, it is very difficult to apply the masks precisely following segmental areas of the display while insuring parallax-free reading. Colloidal displays which are so masked, during their manufacture, require an additional processing step which increases the cost of masked display systems. Reading of the display is also impaired by the "edge effect" which occurs at the edges of controlled segments.

These edge effects limit the lifetime of the systems and arise during operation thereof. The edge effects are caused by enrichment of suspended particles of the colloidal liquid between the electrodes at the edges thereof at the side of the electrodes, with a decrease at the side of the glass. The result is a light, poorly absorbing edge about the respective segment when no control voltage is applied anymore.

THE INVENTION

It is an object to improve a colloidal-type electrode control display system in which the edge effect is avoided and which, nevertheless, can be easily and inexpensively made, while permitting wide latitude in the type of display to be provided.

Briefly, a mask is provided, shaped and dimensioned to sharply define the optical display in the desired pattern as determined by the shape of the segments of the electrodes, and is located with respect to the segments of the electrodes such that the edge effect is suppressed.

The mask, in accordance with a feature of the invention, is located in the interior of the display, that is, at the side of the support strata facing the colloidal substance and, preferably, on the strata which is the one closest to the observer. Electro-optical effects which, for example, occur upon cross-over of conductive tracks, then can be masked and will not be observed by the observer. Support positions and spacers will not be seen. Masking of the segments, precisely, preferably is carried out by applying the mask on a continuous transparent electrode. This is permitted by a manufacturing process in which manufacturing steps can be saved, and thus is particularly simple to make.

The mask can be applied by printing, which is particularly simple, and especially if printing inks of the lacquer type with a rough surface configuration are being used. Other manufacturing processes are suitable, for example application of the masks by vapor deposition, by use of photo-sensitive emulsions, or emulsions well known in the photographic field. By selection of suitable masking materials, all well known in the masking technology, it is readily possible to make the mask to be colored.

DRAWING

The single FIGURE illustrates, highly schematically and in vertical cross section, a colloidal display element, in which the respective layers are shown, not to scale, and highly exaggerated; and from which insulating layers have been omitted for clarity.

DETAILED DESCRIPTION

The colloidal display system has a front layer or a plate 1 to suppress reflections; it is applied on a glass plate 2. A continuous electrode or back plate 3 is applied to the glass plate 2. A mask 4 is located on the continuous electrode. A rear glass plate 7 is provided on which an edged, front plate electrode 6 is located. A colloidal suspension 5 is located between the glass plates 2, 7 and, respectively, the electrodes 3, 6 and the mask 4 thereon. The display is closed off by a rear plate 8 which is a dispersion plate. A lamp 9 is located behind the display in order to illuminate the unit. The view is from beyond the front glass plate 2, as schematically indicated by an observer's eye 10.

The electrode 6, as schematically indicated, is not continuous but applied in form of segments. In accordance with a feature of the invention, the mask 4 is located within the region of the colloidal suspension 5 and so positioned and dimensioned that the shape of the segment which is visible is determined by the mask.

The respectively controlled segment, thus, need no longer have precisely the shape of the display which is to be obtained but, rather, need only be so shaped that it covers completely the area behind the window of the respective mask. This substantially simplifies the layout of the overall display. Symbols, for example symbols used on the dashboard of an automotive vehicle, such as triangular warning symbols and the like, can be readily formed by masking and need no longer be defined by the shapes of the electrodes themselves. It is only necessary to provide a sufficiently large display field. It is also no longer necessary to etch the electrode on the front glass 2, that is, the electrode which is closest to the observer 10. In prior-art electrodes, it was customary to shape the common or back-plate electrode such that no overlap with segmental conductors for the segmental electrodes 6 occured. Within the range of the masking, any number of suitably shaped support posts can be applied. This eliminates the use of micro-spacers which were previously needed to maintain a constant layer thickness.

The manufacturing processes—which will be explained in detail below—permit saving of steps which, in mass production of such displays, leads to substantial savings in manufacturing costs while simultaneously improving the optical output image obtained. The cost savings will depend on some extent on the particular process selected.

MANUFACTURING PROCESSES

In manufacture of the display, the mask is made as the last step, applied preferably to the front glass 2 over the electrode 3, although it is possible to apply the mask, as well, on the back glass 7 over the electrode 6. In accordance with a preferred feature of the invention, the mask is, however, applied on the inside of the display, that is, between the glass plates 2, 7, on the forward glass plate 2, since, in this manner, any possible spacers or support elements which are used within the display will not be visible to the observer 10. Additionally, cross-over in conductive tracks will not be noticed since they can be covered by the masking. Of course, in general principle, it is possible to also apply the mask on the front plate electrode, that is, over the electrode 6.

Printing of the mask is a suitable method of application. Screen printing, offset printing or the like may be used to apply a, usually, opaque mask. The windows of the mask may be covered, in a further step, by colored ink or coloring substance, if certain segments of the display are to appear in color. The thickness of the applied printing, preferably, should not exceed about 0.01 mm when using lacquers having a smooth surface since, then, the cell can no longer be filled. When using lacquers with a rough or uneven or profiled surface, the thickness of the applied print may be the thickness of the desired colloidal layer. Spacers and support posts can then be entirely eliminated since the applied masking ink or lacquer will serve as the spacing element.

Alternatively, the mask can be made by an evaporative system, for example by vapor deposition. Those elements which are not to be masked are to be covered suitably with a protective lacquer or paint, or a metal mask. After so covering, preliminarily, for example the back plate with the electrode 3 applied, the back plate with the electrode is exposed to vapor deposition or to a sputtering process which appears black or opaque or in any desired color; the metal mask or the masking lacquer is then removed by a suitable chemical process, for example by dissolution, as well known in masking technology.

It is also possible to make the mask by a galvanic process. The glass 2 which faces the observer is coated with a transparent conductive layer forming the electrode 3. Consequently, a suitable galvanic process may be used to apply a black or colored masking layer electrically on the electrode 3, if processing apparatus not using electricity is not available. Analogous to the previously described methods, those zones which are not to be masked must be covered by a production mask in a suitable pattern, for example by applying a photo resist thereover. Galvanic deposition, of course, is possible only when the mask 4 is to be applied on the continuous electrode or back-plate electrode 3 on the front glass plate 2.

The mask can also be applied by a photographic process. In such a method, the glass 2 to be masked is coated with a photo-sensitive layer, for example of the well known photographic photo-sensitive type, exposed through an exposure mask and developed, so that the segmental zones will become transparent. Photo-sensitive paints or lacquers which become black upon development are suitable in general for this process; generally well known and standard photographic emulsions can be applied on the respective glass plates 2, 7—preferably glass plate 2—on which the respective electrodes 3, 6, respectively, have previously been applied. The photographic emulsion can be poured over the respectively coated glass plate 2, 7. Photographic emulsions which can be poured are particularly suitable since they are extremely thin, optically very dense, and highly resistant with respect to chemical attack, that is, chemicals which may be used in the manufacture of the cells. Such an arrangement is particularly suitable for colloidal displays since the photo-sensitive layer simultaneously provides an insulating layer, needed in colloidal displays in any event. Since the relatively thick carrier layer on the transparent display field will remain, excellent insulation is obtained.

The mask may also be formed in a combined vapor deposition-etching process. The glass support 2, after having the transparent electrode 3 applied thereto, is coated with a black layer, for example chromium, by reactive vapor deposition. In a customary process, the glass is then coated with a photo-sensitive lacquer, optically exposed, and developed. Those portions which carry the information are thus exposed. The black layer then is etched off at those regions. If chromium layers are used, a suitable etching solution is potassium hexacyanoferrate ($K_3(FE(CN)_6$+NaOH). Other marking layers than black marking layers within the display can be used, and it is also possible to provide predetermined segments of a configuration in selected colors. Color emulsions can be used which, depending on the particular emulsion applied—that is, positive or negative process—use light-sensitive layers which are exposed optically with the mask of the particular color to be shown, if the positive system is used; or with a mask in the complementary color, if a negative process is used. The result will be an opaque mask with color zones, in which the surface of the support material will remain as a completely plain surface.

By combining a plurality of printing steps in a single photographic process, additional working steps in manufacture can be eliminated. The colored display is completely free from parallax.

The photographic method, either positive or negative processes, or a combination thereof, permits manufacture of colored display by a single masking, requiring only a single masking layer. Multiple layers within the interior of the cell could hardly be used due to their thickness, so that the customary method of manufacturing colored displays by applying a plurality of colored layers at the outside of the cell cannot be used when the multi-colored display is to be made with the mult-colored effects being obtained by inside application of the mask. By use of emulsions which can be exposed, selectively, by light of the color to be obtained, or by light in the complementary color, an opaque mask with colored zones, which, nevertheless, has a plain surface and utilizes only a single layer, can be obtained.

The lifetime of colloidal displays is limited by the "edge effect" which arises in operation of the display. The edge effect is generated by enrichment of suspended particles at the edges of the electrodes of the controlled segments at the side of the electrodes; at the side of the glass, a depletion of colloidal particles results. As a consequence, a lighter or brighter, light absorbing edge about the respective segment will occur if no control voltage is applied anymore. By application of an opaque mask within the display surface, the electrode edges on which such an "edge effect" occurs can be covered, so that the lighter or brighter depletion zone will be located behind the mask, and thus no longer will be visible. The application of the mask, thus, so located, shaped and dimensioned to sharply define the optical display as desired, that is, at the desired segments, or in the desired pattern as determined by the shape of the electrodes 6 completely eliminates the edge effect in colloidal display structures.

Various changes and modifications may be made, and features and processes described herein can be used selectively or in combination, within the scope of the inventive concept.

I claim:

1. Colloidal electro-optical display device having A transparent front support plate (2) adapted to face an observer (10);
   a transparent front electrode (3) applied on the front support plate at the side remote from the observer;
   a back support plate (7) positioned parallel to the front support plate and spaced therefrom;
   a counter electrode (6) located on the back support plate on the side facing the front electrode;
   a colloidal suspension (5) filling the space between the electrodes, at least one of the electrodes being arranged in a desired display pattern, defining a plurality of display zones, said colloidal suspension providing an optical effect upon application of an electrical voltage between the electrodes; and
   a mask (4) located between the support plates and supported by one of the support plates (2,7) for selective covering of the display zones,
   wherein, in accordance with the invention,
   the mask (4) is shaped and dimensioned to sharply define the optical display in the desired pattern as determined by the shape of said at least one of the electrodes and located with respect to said at least one electrode for suppression of any edge effects arising from enrichment in said colloidal suspension, adjacent to edges of said electrodes, of suspended particles.

2. Device according to claim 1, wherein the mask (4) is located at the side of the colloidal suspension (5) which faces the observer (10).

3. Device according to claim 2, wherein the mask (4) is supported on the transparent front electrode (3) at the side thereof facing the colloidal suspension.

4. Device according to claim 1, wherein the mask (4) is opaque.

5. Device according to claim 1, wherein the mask (4) is transparent and colored.

6. Device according to claim 1, wherein the mask (4) has opaque portions and other portions which are transparent and are characterized by at least one of: colorless transparency; and colored transparency.

7. Device according to claim 1, wherein the mask (4) comprises a printed masking material.

8. Device according to claim 7, wherein the mask (4) comprises printed ink or lacquer with a rough or coarse surface.

9. Device according to claim 1, wherein the mask (4) comprises vapor-deposited masking material.

10. Device according to claim 1, wherein the mask (4) comprises photo-sensitive lacquer.

11. Device according to claim 1, wherein the mask (4) comprises a photographic emulsion.

12. Device according to claim 11, wherein the photographic emulsion is a multi-color emulsion which, upon being subjected to light of various colors in different regions, provides transparent zones in different colors.

13. Device according to claim 1, wherein the mask (4) comprises a galvanically deposited coating.

14. Device according to claim 1, wherein the mask (4) comprises a photo-sensitive glaze which is selectively opaque.

15. Device according to claim 1, wherein the mask (4) comprises discontinuous portions and has a thickness corresponding, at least approximately, to the spacing of the front support plate and the back support plate from each other to form distance spacing elements between the front electrode (3) and the counter electrode (6) for reception of said colloidal suspension (5) therebetween.

16. Device according to claim 15, wherein the mask (4) forms an insulating layer and surface orientation layer.

17. Method of making a colloidal electro-optical display device having
    A transparent front support plate (2) adapted to face an observer (10);
    a transparent front electrode (3) applied on the front support plate at the side remote from the observer;
    a back support plate (7) positioned parallel to the front support plate and spaced therefrom;
    a counter electrode (6) located on the back support plate on the side facing the front electrode;
    a colloidal suspension (5) filling the space between the electrodes, at least one of the electrodes being arranged in a desired display pattern, defining a plurality of display zones, said colloidal suspension providing an optical effect upon application of an electrical voltage between the electrodes; and
    a mask (4) located between the support plates and supported by one of the support plates (2,7) for selective covering of the display zones,
    said method including the steps of
    vapor-depositing a masking coating on at least one of the electrodes;
    defining the zones or outlines of the mask by a photosensitive, removable medium or photo-resist configured for suppression of any edge effects arising from enrichment in said colloidal suspension, adjacent to edges of said electrodes, of suspended particles; and
    removing, by etching, the photo-sensitive medium or photo-resist in accordance with the definition of the mask and dissolving said mask.

18. Method of making a colloidal electro-optical display device having
    a transparent front support plate (2) adapted to face an observer (10);
    a transparent front electrode (3) applied on the front support plate at the side remote from the observer;
    a back support plate (7) positioned parallel to the front support plate and spaced therefrom;
    a counter electrode (6) located on the back support plate on the side facing the front electrode;
    a colloidal suspension (5) filling the space between the electrodes, at least one of the electrodes being arranged in a desired display pattern, defining a plurality of display zones, said colloidal suspension providing an optical effect upon application of an electrical voltage between the electrodes; and
    a mask (4) located between the support plates and supported by one of the support plates (2,7) for selective covering of the display zones,
    said method including the steps of applying said mask comprising
    coating a photo-sensitive glaze on the respective electrode; and
    exposing the coated glaze to light and heat, in a selected masking pattern configured for suppression of any edge effects arising from enrichment in said colloidal suspension, adjacent to edges of said electrodes, of suspended particles, to thereby render opaque the exposed and heated zones of the photosensitive glaze.

* * * * *